US008780782B2

(12) United States Patent
Amerga et al.

(10) Patent No.: US 8,780,782 B2
(45) Date of Patent: Jul. 15, 2014

(54) METHOD AND APPARATUS FOR HANDLING RADIO LINK FAILURE IN LTE EMBMS

(75) Inventors: Daniel Amerga, San Diego, CA (US); Kuo-Chun Lee, San Diego, CA (US); Shailesh Maheshwari, San Diego, CA (US); Jack S Shauh, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 152 days.

(21) Appl. No.: 13/422,734

(22) Filed: Mar. 16, 2012

(65) Prior Publication Data

US 2013/0242716 A1    Sep. 19, 2013

(51) Int. Cl.
*H04H 20/71*    (2008.01)
(52) U.S. Cl.
USPC ................................................ 370/312
(58) Field of Classification Search
CPC ....... H04W 24/04; H04W 4/06; H04W 76/00; H04W 76/002; H04W 76/025; H04W 76/027; H04L 12/18; H04L 12/185; H04L 49/201; H04L 45/16; H04L 61/2069; H04L 65/4076; H04L 2012/5642
USPC .................. 370/312, 328–350, 390
See application file for complete search history.

(56) References Cited

U.S. PATENT DOCUMENTS

| 7,649,865 | B2 * | 1/2010 | Sarkkinen | 370/331 |
| 7,756,532 | B2 * | 7/2010 | Wallentin et al. | 455/464 |
| 7,852,803 | B2 * | 12/2010 | Kim | 370/328 |
| 8,488,443 | B2 * | 7/2013 | Lee et al. | 370/216 |
| 8,515,415 | B2 * | 8/2013 | Dimou et al. | 455/423 |
| 2008/0074994 | A1 * | 3/2008 | Jen | 370/218 |
| 2010/0110901 | A1 | 5/2010 | Wong et al. | |
| 2010/0311411 | A1 | 12/2010 | Lindbom et al. | |
| 2011/0021154 | A1 * | 1/2011 | Marinier et al. | 455/67.11 |
| 2011/0080825 | A1 * | 4/2011 | Dimou et al. | 370/216 |
| 2011/0242970 | A1 | 10/2011 | Prakash et al. | |

(Continued)

FOREIGN PATENT DOCUMENTS

EP    1761079 A1    3/2007
WO    WO 2011/130444 A1    10/2011

OTHER PUBLICATIONS

3GPP: "3rd Generation Partnership Project; Technical Specification Group Radio Access Network; Radio Resource Control (RRC); Protocol specification (Release 9)", 3GPP Draft; 25.331-V9.10.0, 3rd Generation Partnership Project (3GPP), Mobile Competence Centre ; 650, Route Des Lucioles ; F-06921 Sophia-Antipolis Cedex ; France, Mar. 15, 2012, XP050601452, [retrieved on Mar. 15, 2012] 8.1.3.2, 8.1.3.7, 8.1.4.5, 8.1.4.7, 8.1.4.10, 8.1.6.5, 8.1.6.6, 8.1.8.1, 8.2.2.7, 8.3.1.2, 8.5.6, 8.5.6a, 8.7.3, 10, 10.2.16,10.2.48.

(Continued)

*Primary Examiner* — Frank Duong
(74) *Attorney, Agent, or Firm* — Arent Fox LLP

(57) ABSTRACT

A method, an apparatus, and a computer program product for wireless communication are provided. The apparatus may be a UE. The UE may detect a multicast/broadcast radio link failure based on at least one of decoding errors, lost or error packets/segments, or failure to receive a multicast/broadcast channel for a time period greater than a threshold, and recover from the detected multicast/broadcast radio link failure upon detecting the multicast/broadcast radio link failure.

28 Claims, 12 Drawing Sheets

(56) References Cited

U.S. PATENT DOCUMENTS

2011/0256861 A1   10/2011  Yoo et al.
2013/0007814 A1*  1/2013  Cherian et al. .................. 725/62
2013/0097287 A1*  4/2013  Shauh et al. .................. 709/219
2013/0250782 A1*  9/2013  Nimbalker et al. ........... 370/252

OTHER PUBLICATIONS

"3rd Generation Partnership Project; Technical Specification Group Radio Access Network; Evolved Universal Terrestrial Radio Access (E-UTRA); Radio Resource Control (RRC); Protocol specification(Release 10)", 3GPP Standard; 3GPP TS 36.331, 3rdGeneration Partnership Project (3GPP), Mobile Competence Centre ; 650, Route Deslucioles ; F-06921 Sophia-Antipolis Cedex; France, vol. RAN WG2, No. V10.5.0, Mar. 13, 2012, pp. 1-302, XP050580020, [retrieved on Mar. 13, 2012] 5.3.11.2; 5.3.11.3.

International Search Report and Written Opinion—PCT/US2013/032581—ISA/EPO—May 27, 2013.

LG Electronics Inc: "Discussion on RLC UM for eMBMS", 3GPP Draft; R2-094641 Discussion on RLC UM for EMBMS, 3rd Generation Partnership Project (3GPP), Mobile Competence Centre ; 650, Route Des Lucioles ; F-06921 Sophia-Antipolis Cedex ; France, no. Shenzhen, China; 20090818, Aug. 18, 2009, XP050352733, [retrieved on Aug. 18, 2009].4.

\* cited by examiner

| LCID 1 | Stop MTCH 1 | LCID 2 | Stop MTCH 2 | ... | LCID n | Stop MTCH n |
|---|---|---|---|---|---|---|
| | Stop MTCH 1 | | Stop MTCH 2 | | | Stop MTCH n |

METHOD AND APPARATUS FOR HANDLING RADIO LINK FAILURE IN LTE EMBMS

BACKGROUND

1. Field

The present disclosure relates generally to communication systems, and more particularly, to a method and an apparatus for handling radio link failure (RLF) in Long Term Evolution (LTE) evolved Multimedia Broadcast Multicast Service (eMBMS).

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In an aspect of the disclosure, a method, a computer program product, and an apparatus are provided. The apparatus detects a multicast/broadcast radio link failure based on at least one of decoding errors, lost or error packets/segments, or failure to receive a multicast/broadcast channel for a time period greater than a threshold. In addition, the apparatus recovers from the detected multicast/broadcast radio link failure upon detecting the multicast/broadcast radio link failure.

BRIEF DESCRIPTION OF THE DRAWINGS

FIG. 8 is a diagram illustrating an MCH Scheduling Information MAC control element.

DETAILED DESCRIPTION

Figure 1:
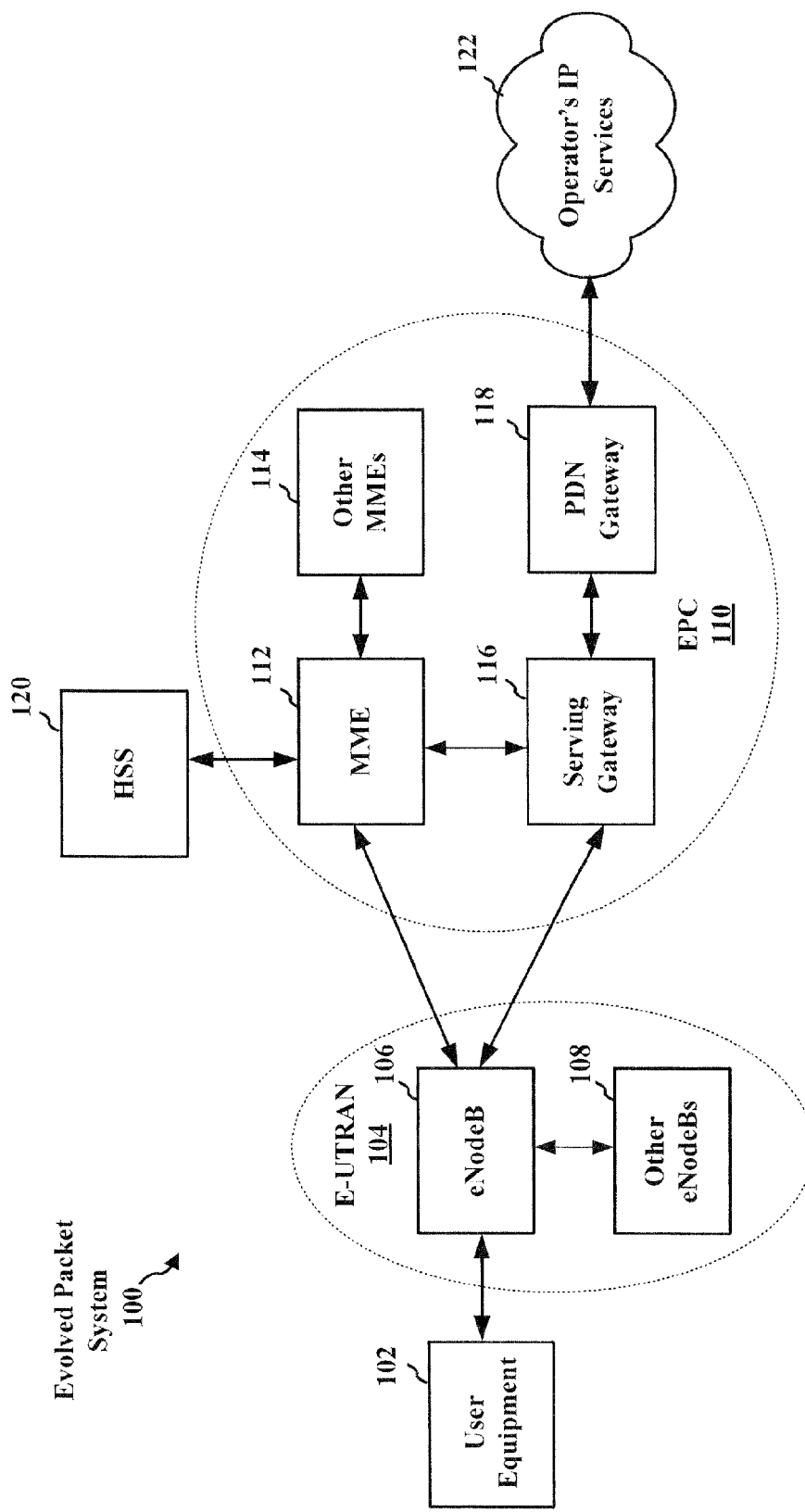
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control planes protocol terminations toward the UE 102. The eNB 106 may be connected to the other eNBs 108 via an X2 interface (e.g., backhaul). The eNB 106 may also be referred to as a base station, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected by an S1 interface to the EPC 110. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, the Intranet, an IP Multimedia Subsystem (IMS), and a PS Streaming Service (PSS).

Figure 2:
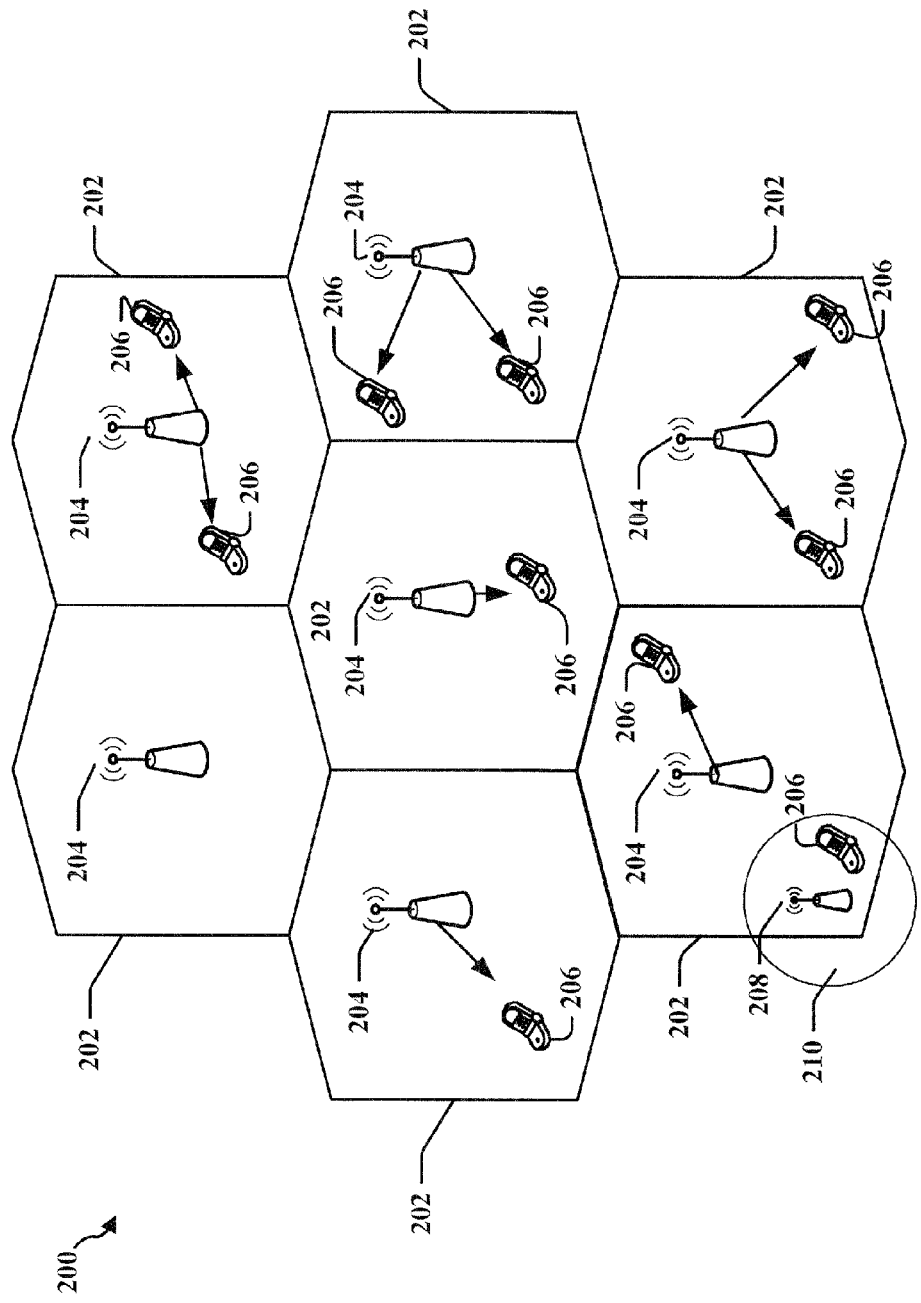
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. A lower power class eNB 208 may be referred to as a remote radio head (RRH). The lower power class eNB 208 may be a femto cell (e.g., home eNB (HeNB)), pico cell, or micro cell. The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
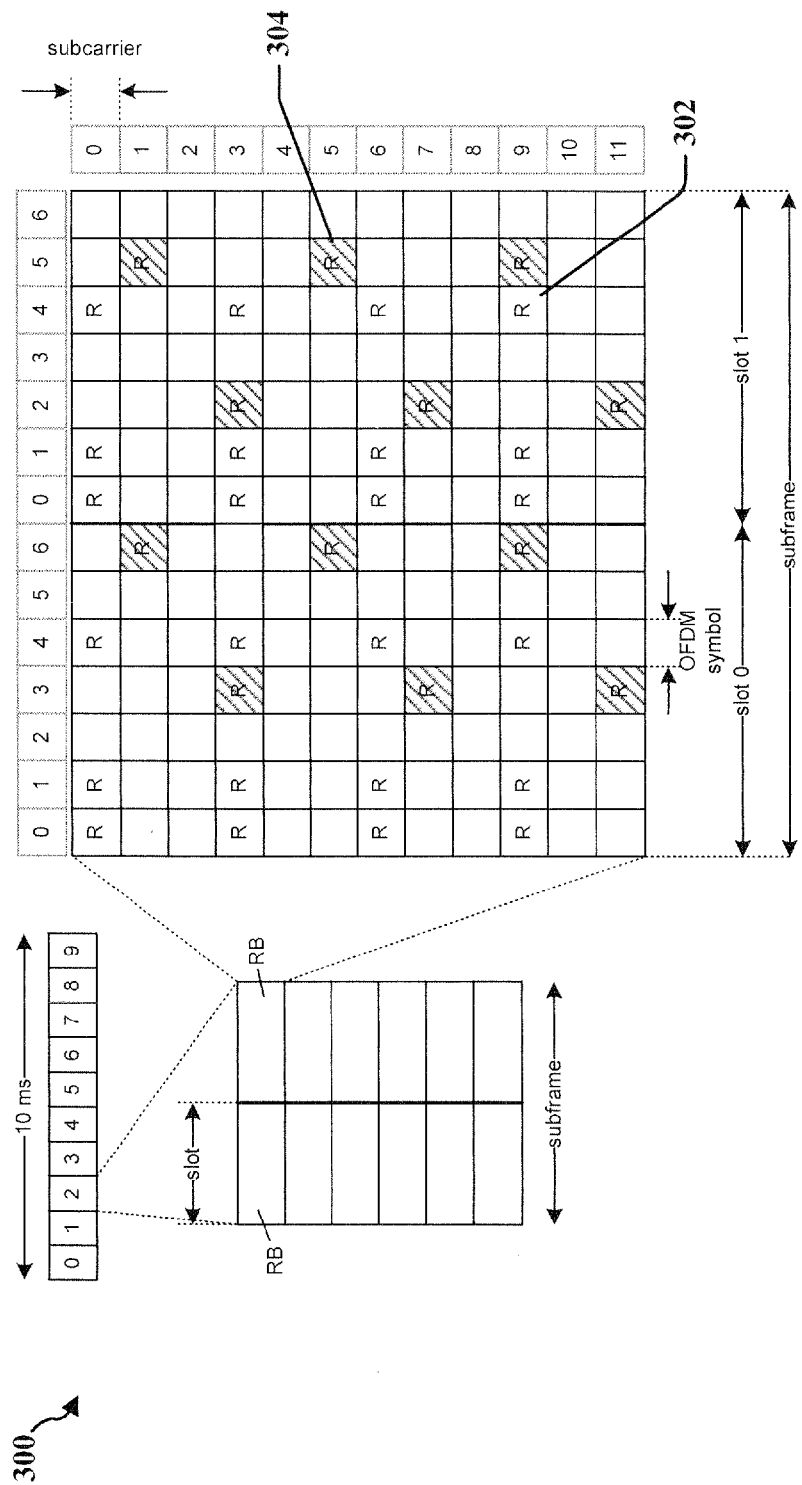
FIG. 3 is a diagram illustrating an example of a DL frame structure in LTE.

FIG. 3 is a diagram 300 illustrating an example of a DL frame structure in LTE. A frame (10 ms) may be divided into 10 equally sized sub-frames. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
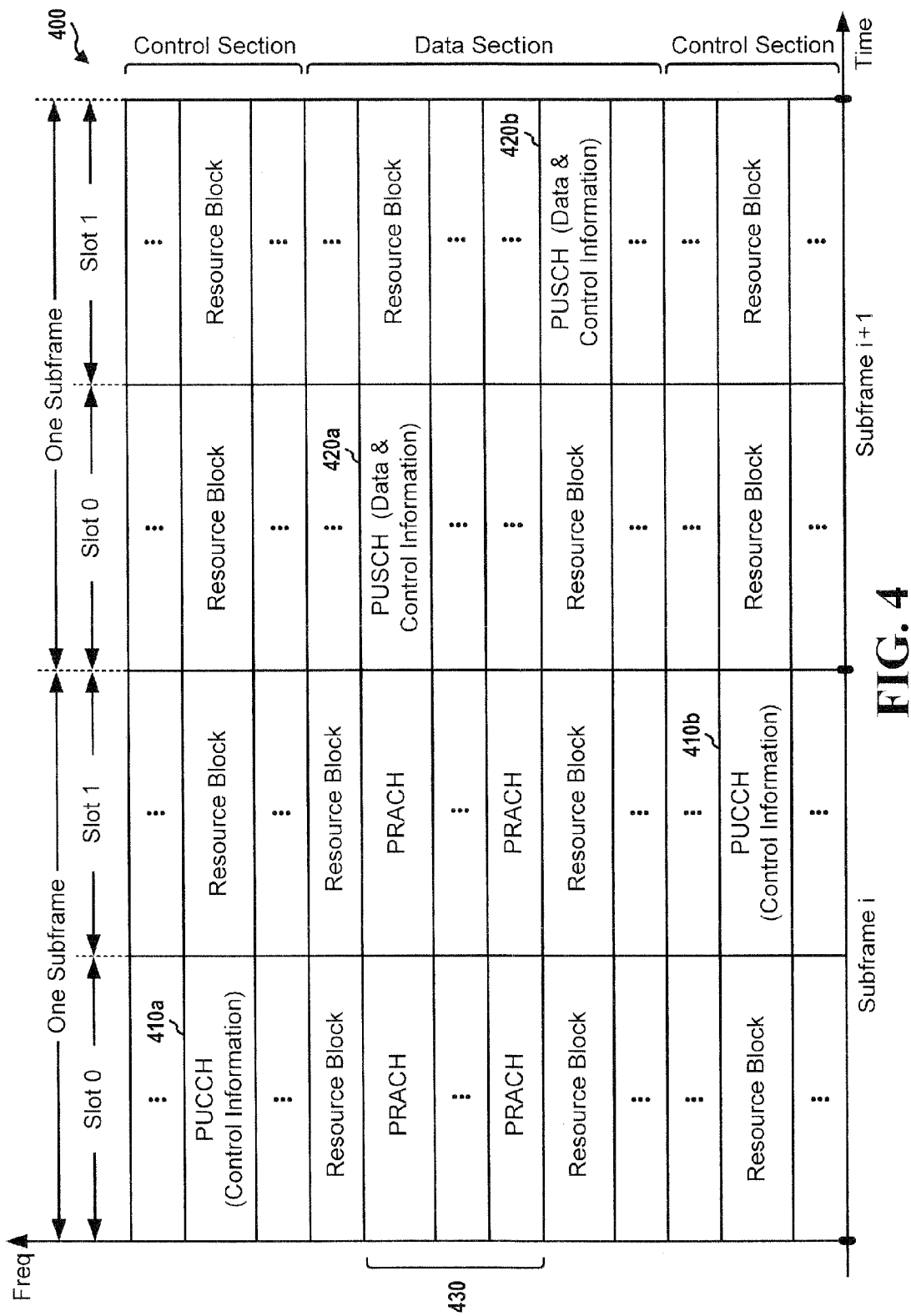
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
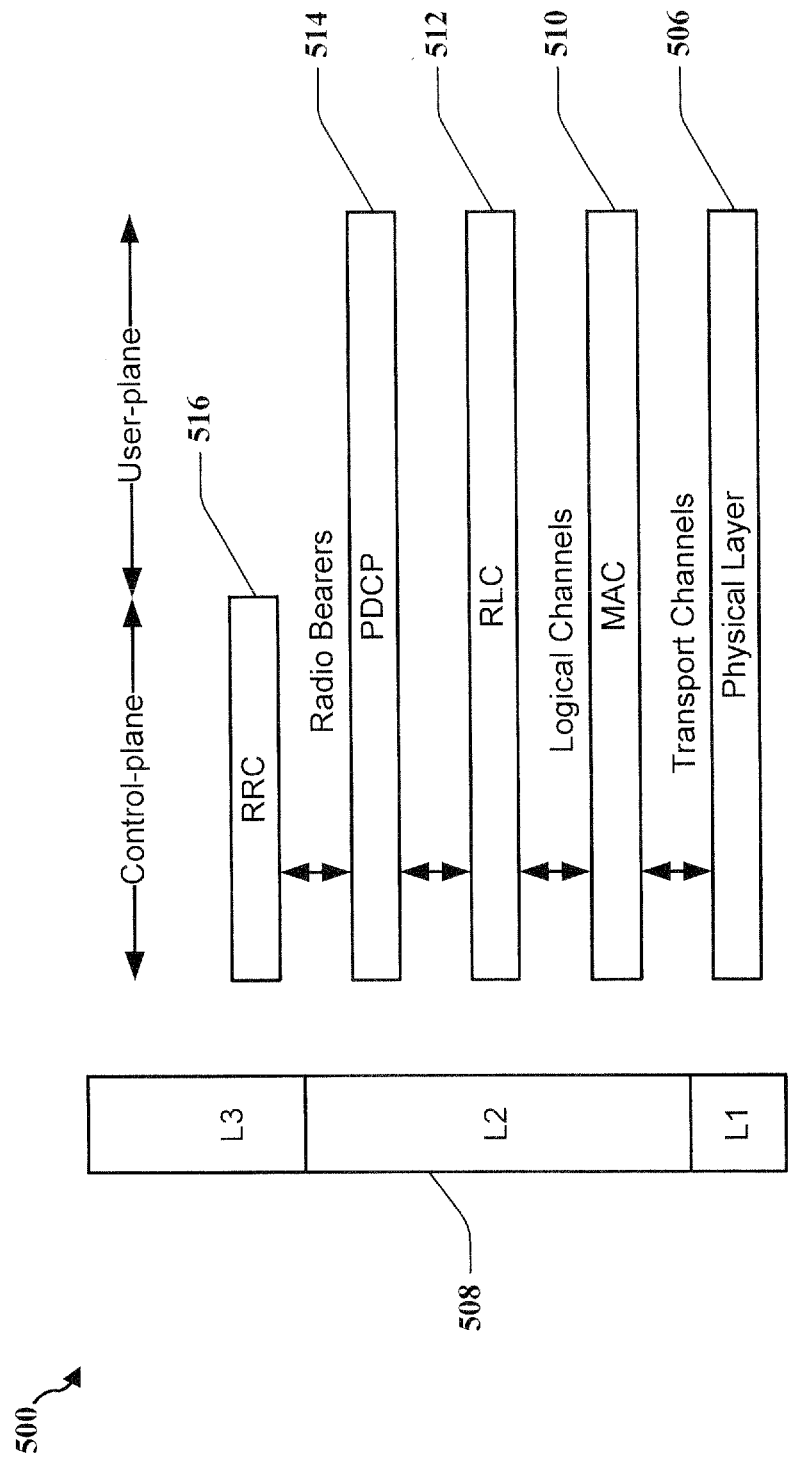
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB and the UE.

Figure 6:
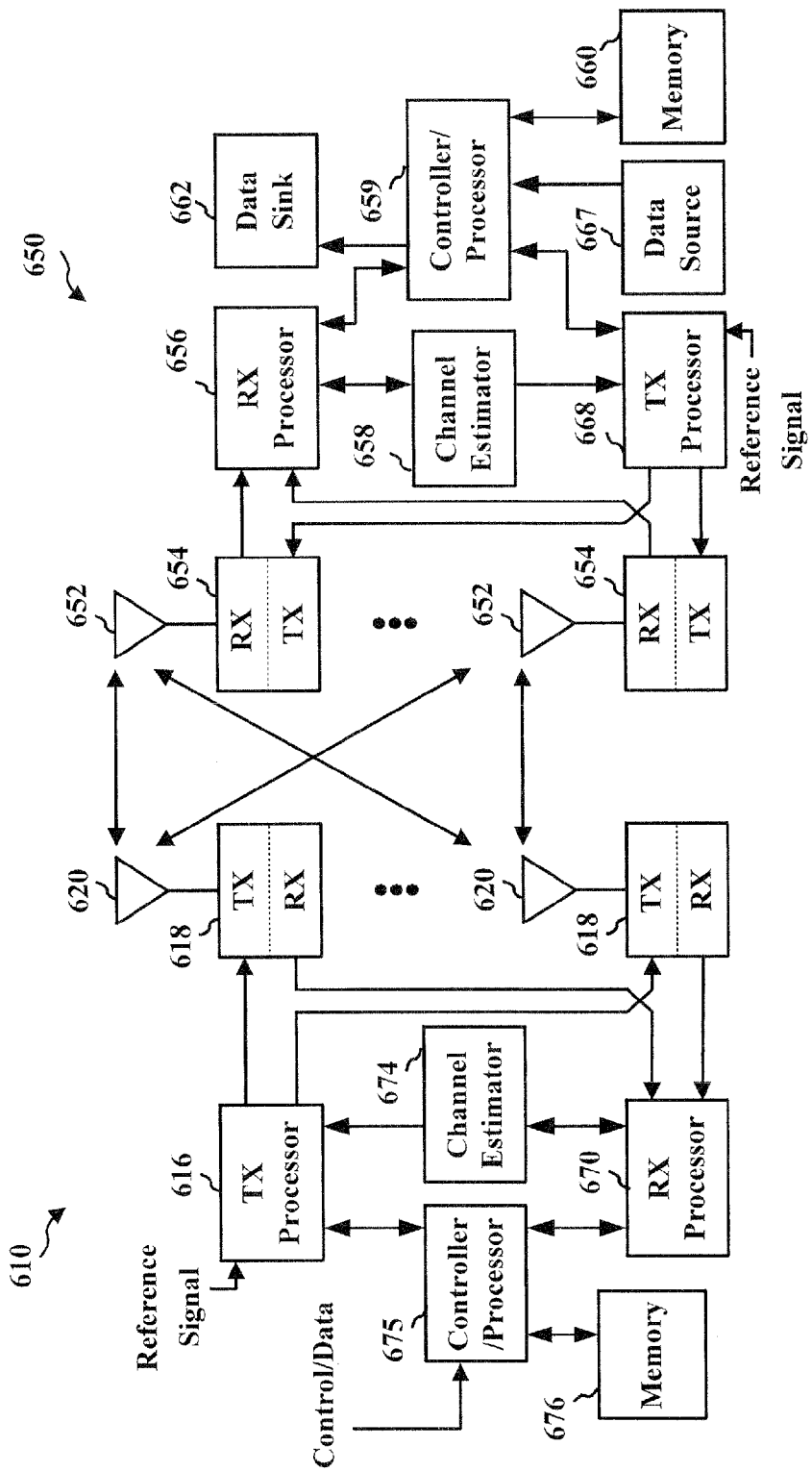
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figure 7:
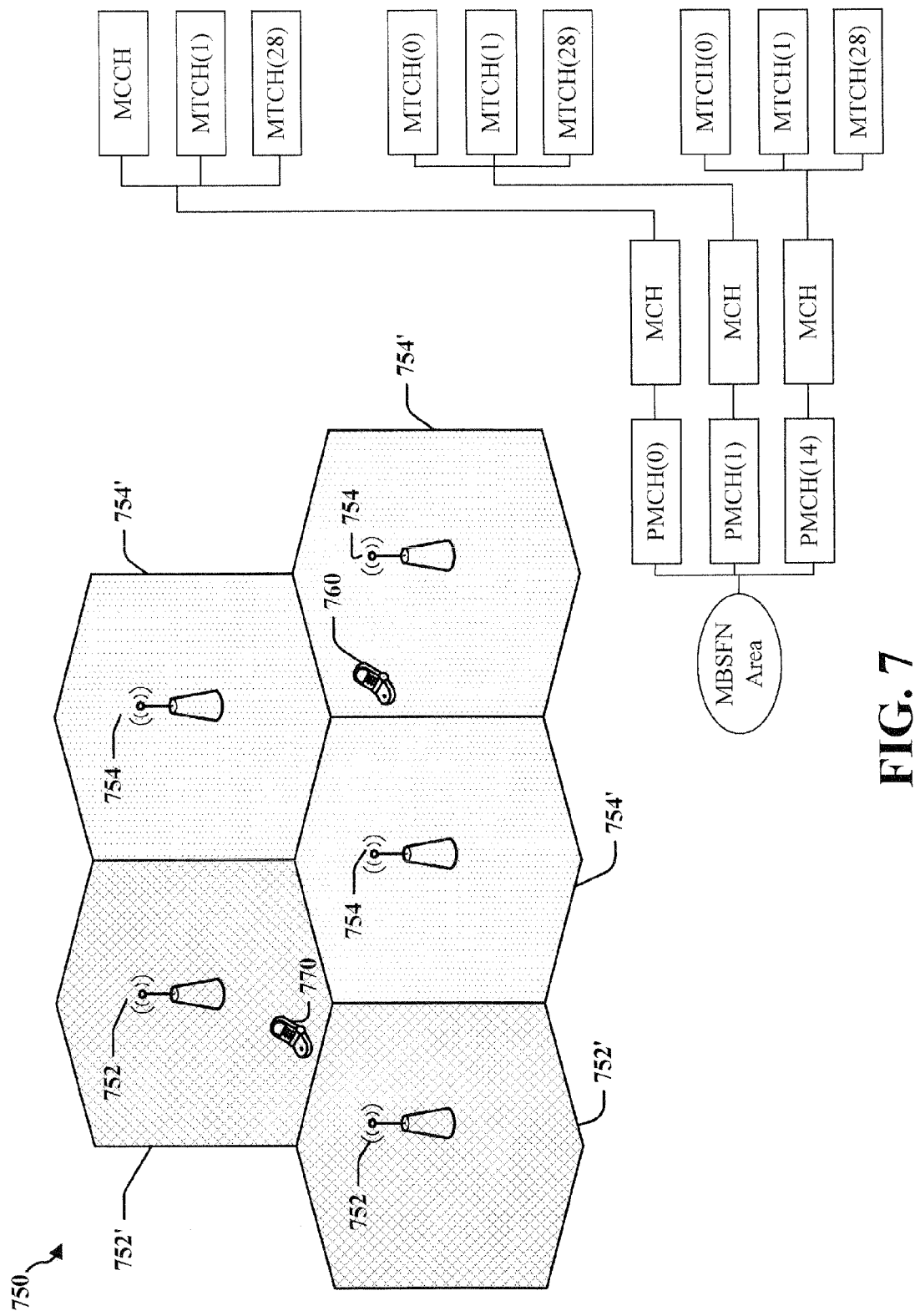
FIG. 7 is a diagram illustrating evolved Multicast Broadcast Multimedia Service in a Multi-Media Broadcast over a Single Frequency Network.

FIG. 7 is a diagram 750 illustrating evolved Multicast Broadcast Multimedia Service (eMBMS) in a Multi-Media Broadcast over a Single Frequency Network (MBSFN). The eNBs 752 in cells 752' may form a first MBSFN area and the eNBs 754 in cells 754' may form a second MBSFN area. The eNBs 752, 754 may be associated with other MBSFN areas, for example, up to a total of eight MBSFN areas. A cell within an MBSFN area may be designated a reserved cell. Reserved cells do not provide multicast/broadcast content, but are time-synchronized to the cells 752', 754' and have restricted power on MBSFN resources in order to limit interference to the MBSFN areas. Each eNB in an MBSFN area synchronously transmits the same eMBMS control information and data. Each area may support broadcast, multicast, and unicast services. A unicast service is a service intended for a specific user, e.g., a voice call. A multicast service is a service that may be received by a group of users, e.g., a subscription video service. A broadcast service is a service that may be received by all users, e.g., a news broadcast. Referring to FIG. 7, the first MBSFN area may support a first eMBMS broadcast service, such as by providing a particular news broadcast to UE 770. The second MBSFN area may support a second eMBMS broadcast service, such as by providing a different news broadcast to UE 760. Each MBSFN area supports a plurality of physical multicast channels (PMCH) (e.g., 15 PMCHs). Each PMCH corresponds to a multicast channel (MCH). Each MCH can multiplex a plurality (e.g., 29) of multicast logical channels. Each MBSFN area may have one multicast control channel (MCCH). As such, one MCH may multiplex one MCCH and a plurality of multicast traffic channels (MTCHs) and the remaining MCHs may multiplex a plurality of MTCHs.

The MCCH may be used to transmit an MBSFN Area Configuration message, which is an RRC message. The MBSFN Area Configuration message may indicate allocated resources (i.e., radio frames and sub frames) for transmitting each PMCH of the MBSFN area, where the allocated resources are configured using the common subframe allocation period by which the resource allocation repeats from one period to the next period; a data modulation and coding scheme (hereinafter referred to as "data MCS") for transmission of MAC protocol data units (PDUs) in the PMCH, excluding MCCH and MCH Scheduling Information (MSI) which use a signaling modulation and coding scheme (hereinafter referred to as "signaling MCS") as signaled in the system information block 13 (SIB13); a temporary mobile group identity (TMGI) and a session identifier of each MTCH for an eMBMS session within the PMCH; a logical channel identifier (LCID) of each MTCH within the PMCH; and an MCH scheduling period (e.g., 8, 16, 32, . . . , or 1024 radio frames) over which an MSI MAC control element is transmitted.

To acquire MCCH, the UE may acquire SIB13, which may indicate the MBSFN area identifier (ID) of each MBSFN area supported by the cell, non-MBSFN region length (1 or 2 symbols) of the MBSFN subframe, an MCCH configuration, and a notification configuration.

The MTCH is used to transmit eMBMS data. A UE can determine the session information of an MTCH of interest using, for example, a TMGI which can be received by the UE via a service announcement and discovery procedure. The TMGI may include additional information, such as an Internet Protocol (IP) address or a File Delivery over Unidirectional Transport (FLUTE) protocol configuration. The UE may then acquire the MCCH to determine the associated MTCH of the eMBMS service of interest.

FIG. 8 is a diagram 800 illustrating an MSI MAC control element. The MSI MAC control element is sent in the first subframe of each scheduling period of the PMCH. As shown in FIG. 8, the MSI MAC control element indicates a stop subframe (e.g., "Stop MTCH 1", "Stop MTCH 2") for each MTCH, which is used to identify the subframes of each MTCH within the PMCH. Accordingly, a UE may use the MSI MAC control element to identify the subframes including an MTCH of interest and decode the subframes of the MTCH to acquire eMBMS data.

For unicast service, UEs detect an RLF upon encountering a certain number of consecutive out-of-sync indications without receiving an in-sync indication. Upon detecting an RLF, the UE performs a radio link reestablishment procedure to attempt to reestablish the unicast connection on an alternative cell. A UE receiving eMBMS can receive the eMBMS MTCH from multiple cells and, therefore, an RLF detected on the current serving cell may not apply. There currently is no RLF detection and recovery procedure for eMBMS. As such, a method and an apparatus to provide RLF detection and recovery to receive eMBMS data in LTE are needed. Exemplary methods are provided infra.

Figure 9:
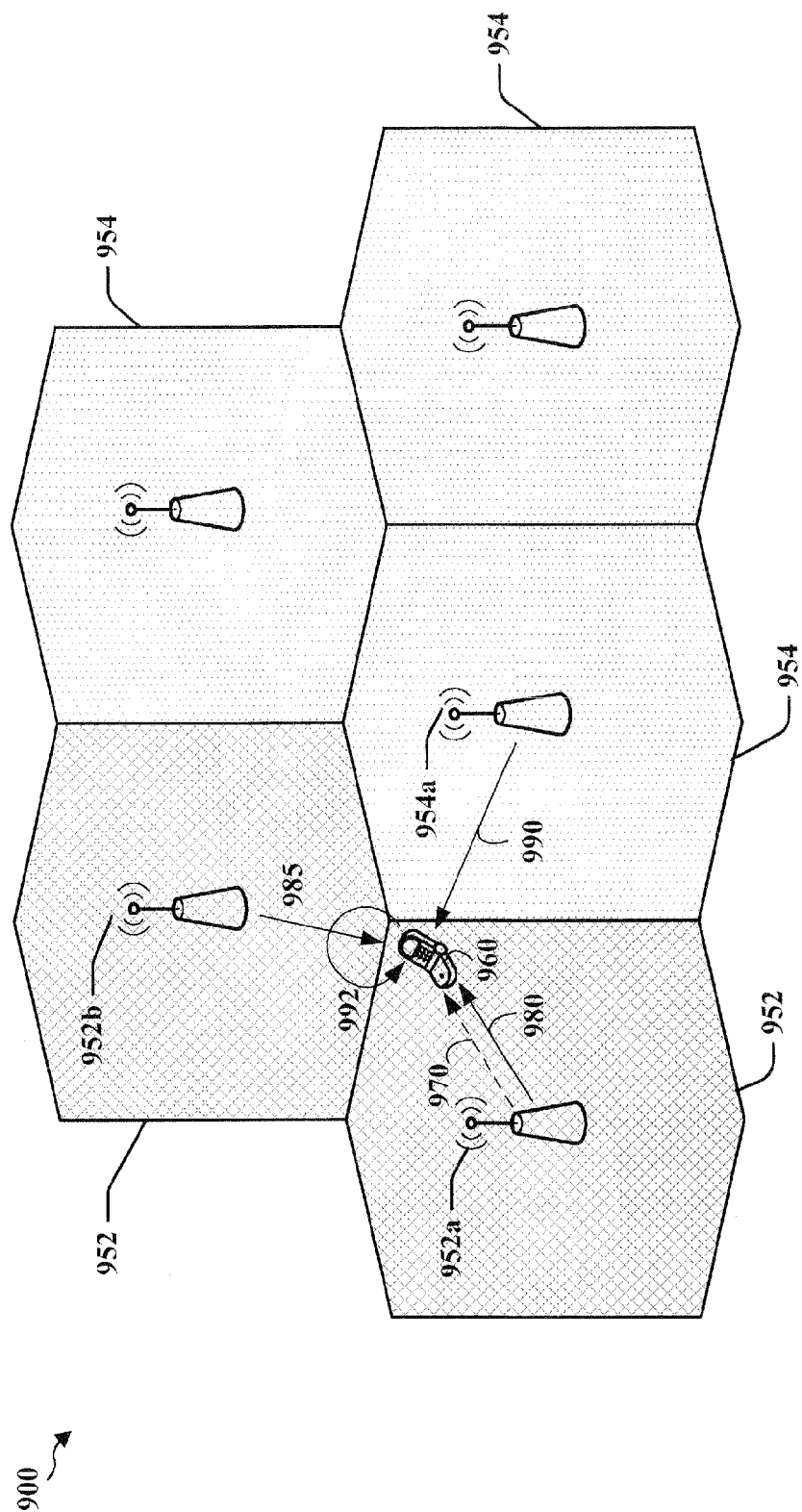
FIG. 9 is a diagram for illustrating an exemplary method.

FIG. 9 is a diagram 900 of an exemplary network in which an exemplary method may be implemented. As shown in FIG. 9, the UE 960 is receiving multicast/broadcast content 970 from one or more eNBs 952*a*, 952*b* in MBSFN area 952. The multicast/broadcast content 970 may include at least one of MTCH, MCCH, or MSI. The UE 960 detects a multicast/broadcast RLF based on at least one of decoding errors with respect to the multicast/broadcast content 970, lost or error packets/segments with respect to the multicast/broadcast content 970, or failure to receive a multicast/broadcast channel for a time period greater than a threshold. Upon detecting the RLF, the UE 960 attempts to recover from the detected multicast/broadcast RLF.

The UE 960 may implement different counters and thresholds to determine whether the consecutive number of MTCH decoding errors, MCCH decoding errors, and/or MSI MAC control element decoding errors is greater than a threshold. For example, the UE 960 may determine whether the number of consecutive MTCH decoding errors is greater than a threshold by setting a counter to zero and incrementing the counter for each consecutive MTCH decoding error. The UE 960 may then compare the value of the counter to a threshold and detect an eMBMS RLF when the value of the counter is greater than the threshold. Otherwise, the UE 960 may reset the counter to zero when the MTCH is properly decoded. In another configuration, the UE 960 may determine whether the number of consecutive MTCH decoding errors is greater than a threshold by setting a counter to a threshold and decrementing the counter for each consecutive MTCH decoding error. The UE 960 may then detect an eMBMS RLF when the value of the counter is zero. Otherwise, the UE 960 may reset the counter to the threshold when the MTCH is properly decoded. For example, each of the different counters may be implemented using a register or data structure in a processor of the UE 960. The processor of the UE 960 may be configured to increment or decrement an appropriate counter in response to an interrupt that may be triggered when an MTCH, MCCH, and/or MSI MAC control element decoding error occurs.

In another configuration, the UE 960 may determine whether the number of MTCH decoding errors within a particular set of subframes is greater than a threshold by setting a counter to zero and incrementing the counter for each MTCH decoding error. The UE 960 may compare the value of the counter to a threshold upon reaching the end of the particular set of subframes and detect an eMBMS RLF when the value of the counter is greater than the threshold. Otherwise, the UE 960 may reset the counter. In another configuration, the UE 960 may determine whether the number of MTCH decoding errors within a particular set of subframes is greater than a threshold by setting a counter to a threshold and decrementing the counter for each MTCH decoding error. Upon reaching the end of the particular set of subframes, the UE 960 may detect an eMBMS RLF when the value of the counter is zero. Otherwise, the UE 960 may reset the counter to the threshold.

For example, the UE 960 may detect an eMBMS RLF when the number of consecutive MTCH decoding errors is greater than a threshold $N_1$ (e.g., $N_1=100$). The UE 960 may detect an eMBMS RLF when the number of MTCH decoding errors within a particular set of subframes is greater than a threshold. For example, if the UE 960 encounters greater than $a*N_2$ MTCH decoding errors within $N_2$ (e.g., $N_2=100$) subframes, where a is a percentage less than 100% (e.g., a=10%), the UE 960 may detect an eMBMS RLF. The UE 960 may detect an eMBMS RLF when the number of consecutive MCCH decoding errors is greater than a threshold. For example, the UE 960 may detect an eMBMS RLF when the number of consecutive MCCH decoding errors is greater than $N_3$ (e.g., $N_3=10$). The UE 960 may detect an eMBMS RLF when the number of consecutive MSI MAC control element decoding errors is greater than a threshold. For example, the UE 960 may detect an eMBMS RLF when the consecutive number of MSI MAC control element decoding errors is greater than $N_4$ (e.g., $N_4=10$). The UE 960 may detect an eMBMS RLF when the number of lost or error packets with respect to a total number of packets received is greater than a threshold. For example, if the UE 960 encounters greater than $b*N_5$ lost or error FLUTE packets within $N_5$ (e.g., $N_5=100$) FLUTE packets, where b is a percentage less than 100% (e.g., h=10%), the UE 960 may detect an eMBMS RLF. The UE 960 may detect an eMBMS RLF when the number of lost or error file segments with respect to a total number of file segments received is greater than a threshold. For example, if the UE 960 encounters greater than $c*N_6$ lost or error Dynamic Adaptive Streaming over HTTP (DASH) file segments over $N_6$ (e.g., $N_6=20$) DASH file segments, where c is a percentage less than 100% (e.g., c=10%), the UE 960 may detect an eMBMS RLF.

The UE 960 may also detect an eMBMS RLF based on expiration of a timer. For example, the UE 960 may set a timer 992 upon receiving MCCH and/or MSI. The UE 960 may detect an eMBMS RLF if the timer expires without receiving MCCH and/or MSI. As such, the UE 960 may detect an eMBMS RLF when at least one of an MCCH or MSI is not received for a time period greater than a threshold.

Once the UE 960 detects an eMBMS RLF, the UE 960 attempts to recover from the eMBMS RLF. The UE 960 may attempt to recover from the eMBMS RLF by (A) reacquiring at least one of the SIB13, a multicast/broadcast area configuration message on the MCCH, MSI, or data on an MTCH. For example, the UE 960 may reacquire 980 at least one of the SIB13, a multicast/broadcast area configuration message on the MCCH, MSI, or data on a MTCH from the eNB 952*a*. The UE 960 may attempt to recover from the eMBMS RLF by (B) performing a service announcement and discovery procedure to receive a configuration for multicast/broadcast services from the eNB 952*a* and then performing (A). The UE 960 may attempt to recover from the eMBMS RLF by (C) reselecting from the current eNB 952*a* on a first frequency to a different eNB 952*b* on the first frequency and then performing (A) with respect to the eNB 952*b* to acquire 985 at least one of the SIB13, a multicast/broadcast area configuration message on the MCCH, MSI, or data on a MTCH from the eNB 952*b*. The UE 960 may attempt to recover from the eMBMS RLF by (D) reselecting from the current eNB 952*a* on the first frequency to a different eNB 954*a* within the MBSFN area 954 on a second frequency and then performing (A) with respect to the eNB 954*a* to acquire 990 at least one of the SIB13, a multicast/broadcast area configuration message on the MCCH, MSI, or data on a MTCH from the eNB 954*a*. It should be noted that any of the steps 1012, 1014, 1016, and 1018 may be performed sequentially, in parallel, or in various orders.

Figure 10:
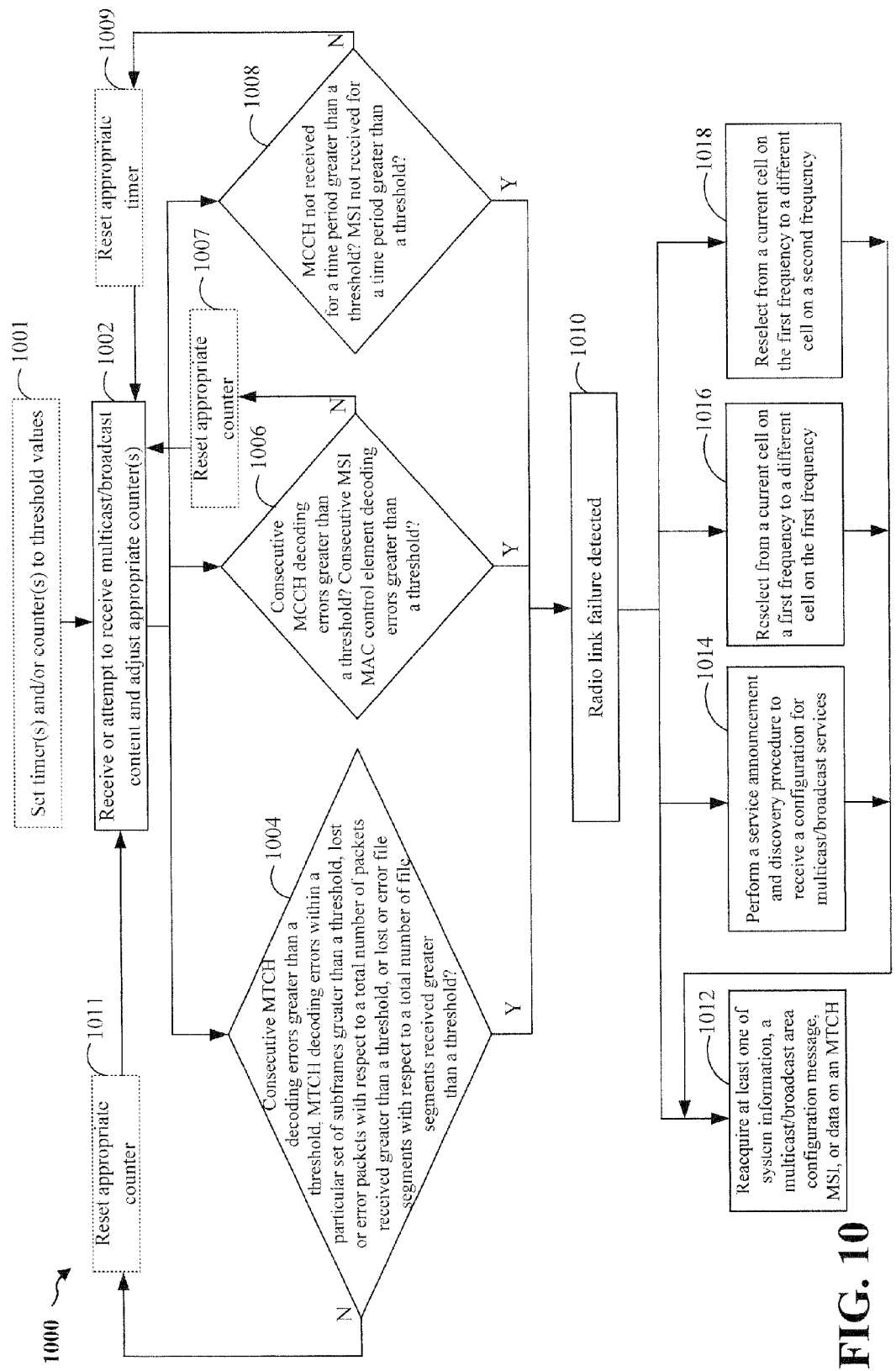
FIG. 10 is a flow chart of a method of wireless communication.

FIG. 10 is a flow chart 1000 of a method of wireless communication. The method may be performed by a UE. If the UE implements a timer and/or a counter for determining the RLF, at step 1001, the UE may set one or more timers and/or one or more counters.

For example, the UE may set a timer such that an RLF may be detected when at least one of the MCCH or the MSI is not received for a timer period greater than a threshold. The UE may set different timers for the MCCH and the MSI. The different timers may have different threshold values. As another example, the UE may implement different counters and thresholds to determine whether the consecutive number of MTCH decoding errors is greater than a threshold, whether the number of MTCH decoding errors within a particular set of subframes is greater than a threshold, whether the consecutive number of MCCH decoding errors is greater than a threshold, and/or whether the consecutive number of MSI MAC control element decoding errors is greater than a threshold. For example, each of the different counters may be implemented using a register or data structure in a processor of the UE. The processor of the UE may be configured to increment or decrement an appropriate counter in response to an interrupt that may be triggered when an MTCH, MCCH, and/or MSI MAC control element decoding error occurs.

At step 1002, the UE may receive multicast/broadcast content and adjust one or more appropriate counters that are configured to count decoding errors. The multicast/broadcast content may include at least one of an MTCH, an MCCH, or an MSI MAC control element. At step 1004, if the UE encounters a number of consecutive MTCH decoding errors greater than a threshold, a number of MTCH decoding errors within a particular set of subframes greater than a threshold, a number of lost or error packets with respect to a total number of packets received greater than a threshold, or a number of lost or error file segments with respect to a total number of file segments received greater than a threshold, the UE detects an RLF at step 1010. Otherwise, the UE may receive or attempt to receive multicast/broadcast content at step 1002.

If the UE utilizes a counter for counting the consecutive MTCH decoding errors and/or a counter for counting the MTCH decoding errors within a particular set of subframes, and determines that the counter for the consecutive MTCH decoding errors and/or the counter for the MTCH decoding errors within a particular set of subframes has not exceeded a threshold, the UE may reset the counter for the consecutive MTCH decoding errors and/or the counter for the MTCH decoding errors within a particular set of subframes that has not exceeded a threshold in step 1011.

In one configuration, the UE may determine whether the number of consecutive MTCH decoding errors is greater than a threshold in step 1004 by setting a counter to zero and incrementing the counter for each consecutive MTCH decoding error. The UE may then compare the value of the counter to a threshold and detect an eMBMS RLF when the value of the counter is greater than the threshold. Otherwise, the UE may reset the counter to zero when the MTCH is properly decoded. In another configuration, the UE may determine whether the number of consecutive MTCH decoding errors is greater than a threshold by setting a counter to a threshold and decrementing the counter for each consecutive MTCH decoding error. The UE may then detect an eMBMS REF when the value of the counter is zero. Otherwise, the UE may reset the counter to the threshold when the MTCH is properly decoded.

In another configuration, the UE may determine whether the number of MTCH decoding errors within a particular set of subframes is greater than a threshold in step 1004 by setting a counter to zero and incrementing the counter for each MTCH decoding error. The UE may compare the value of the counter to a threshold upon reaching the end of the particular set of subframes and detect an eMBMS RLF when the value of the counter is greater than the threshold. Otherwise, the UE may reset the counter. In another configuration, the UE may determine whether the number of MTCH decoding errors within a particular set of subframes is greater than a threshold by setting a counter to a threshold and decrementing the counter for each MTCH decoding error. Upon reaching the end of the particular set of subframes, the UE may detect an eMBMS RLF when the value of the counter is zero. Otherwise, the UE may reset the counter to the threshold.

At step 1006, if the UE encounters a number of consecutive MCCH decoding errors greater than a threshold or a number of consecutive MSI MAC control element decoding errors greater than a threshold, the UE detects an RLF at step 1010. Otherwise, the UE may receive or attempt to receive multicast/broadcast content at step 1002.

If the UE utilizes a counter for counting the consecutive MCCH decoding errors and/or a counter for counting the consecutive MSI MAC control element decoding errors, and determines that the counter for the MCCH decoding errors and/or the counter for the MSI MAC control element decoding errors has not exceeded a threshold, the UE may reset the counter for the MCCH decoding errors and/or the counter for the MSI MAC control element decoding errors that has not exceeded a threshold in step 1007.

In one configuration, the UE may determine whether the number of consecutive MCCH decoding errors and/or MSI MAC control element decoding errors is greater than a threshold in step 1006 by setting a counter for the consecutive MCCH decoding errors and a counter for the consecutive MSI MAC control element decoding errors to zero, and incrementing the counter for the consecutive MCCH decoding errors when consecutive MCCH decoding errors occur and incrementing the counter for the consecutive MSI MAC control element decoding errors when consecutive MSI MAC control element decoding errors occur. The UE may then compare the value of each counter to a corresponding threshold and detect an eMBMS RLF when the value of the counter is greater than the corresponding threshold. Otherwise, the UE may reset the corresponding counter to zero when the MCCH and/or MSI MAC control element is properly decoded.

In another configuration, the UE may determine whether the number of consecutive MCCH and/or MSI MAC control element decoding errors is greater than a threshold by setting a counter for the consecutive MCCH decoding errors and a counter for the consecutive MSI MAC control element decoding errors to a corresponding threshold, and decrementing the counter for the consecutive MCCH decoding errors when consecutive MCCH decoding errors occur and decrementing the counter for the consecutive MSI MAC control element decoding errors when consecutive MSI MAC control element decoding errors occur. The UE may then detect an eMBMS RLF when the value of the corresponding counter is zero. Otherwise, the UE may reset the corresponding counter to the threshold when the MCCH and/or MSI MAC control element is properly decoded.

At step 1008, if the MCCH is not received for a time period greater than a threshold or if the MSI is not received for a time period greater than a threshold, the UE detects an RLF at step 1010. Otherwise, the UE returns to step 1002 and continues to receive or attempts to receive multicast/broadcast content. If the UE utilizes a timer for detecting an RLF and determines that the MCCH and/or the MSI has been received before a timer period exceeds a threshold, the UE resets the timer to the threshold value in step 1009 before returning to step 1002.

At step 1012, the UE may (A) reacquire at least one of system information (e.g., SIB13), a multicast/broadcast area configuration message, MSI, or data on an MTCH. At step 1014, the UE may (B) perform a service announcement and discovery procedure to receive a configuration for multicast/broadcast services and then perform (A). At step 1016, the UE may (C) reselect from the current cell on a first frequency to a different cell on the first frequency and then perform (A) with respect to the different cell. At step 1018, the UE may (D) reselect from the current cell on a first frequency to a different cell on a second frequency and then perform (A) with respect to the different cell.

For example, if the UE determines an eMBMS RLF based on decoding errors of the MTCH at step 1004, the UE receives eMBMS content which includes MTCH and determines N consecutive MTCH decoding errors. If N is less than a threshold $N_1$ (e.g., $N_1$=100), then the UE determines that no eMBMS RLF has occurred and receives or attempts to receive eMBMS content at step 1002. However, if N is greater than the threshold $N_1$, then the UE determines that an eMBMS RLF has occurred at step 1010. The UE may also determine an eMBMS RLF based on decoding errors of the MTCH at step 1004 by determining N MTCH decoding errors within $N_2$ (e.g., $N_2$=100) subframes. If N is less than a threshold $a*N_2$, where a is a percentage less than 100% (e.g., a=10%), then the UE determines that no eMBMS RLF has occurred and receives or attempts to receive eMBMS content at step 1002. However, if N is greater than the threshold $a*N_2$, then the UE determines that an eMBMS RLF has occurred at step 1010. If the UE determines an eMBMS RLF based on lost or error packets of the MTCH at step 1004, the UE receives eMBMS content including FLUTE packets carried on MTCH and determines N lost or error FLUTE packets of $N_5$ (e.g., $N_5$=100) packets. If N is less than a threshold $b*N_5$, where b is a percentage less than 100% (e.g., b=10%), then the UE determines that no eMBMS RLF has occurred and receives or attempts to receive eMBMS content at step 1002. However, if N is greater than the threshold $b*N_5$, then the UE determines that an eMBMS RLF has occurred at step 1010. Alternatively, the UE may determine an eMBMS RLF based on lost or error file segments of the MTCH at step 1004 by determining N lost or error DASH file segments within $N_6$ (e.g., $N_6$=20) segments. If N is less than a threshold $c*N_6$, where c is a percentage less than 100% (e.g., c=10%), then the UE determines that no eMBMS RLF has occurred and receives or attempts to receive eMBMS content at step 1002. However, if N is greater than the threshold $c*N_6$, then the UE determines that an eMBMS RLF has occurred at step 1010. Upon detecting an eMBMS RLF at step 1010, the UE may then recover from the eMBMS RLF at step 1012, 1014, 1016, or 1018.

For example, if the UE determines an eMBMS RLF based on decoding errors of the MCCH at step 1006, the UE receives eMBMS content which includes MCCH and determines N consecutive MCCH decoding errors. If N is less than a threshold $N_3$ (e.g., $N_3$=10), then the UE determines that no eMBMS RLF has occurred and receives or attempts to receive eMBMS content at step 1002. However, if N is greater than the threshold $N_3$, then the UE determines that an eMBMS RLF has occurred at step 1010. In another configuration, if the UE implements a timer for determining an eMBMS RLF, the UE may set a timer to a threshold value at step 1001. The UE may then receive or attempt to receive eMBMS content at step 1002. If the MCCH is received before the timer expires, the UE may determine that no eMBMS RLF has occurred at step 1008 and may reset the timer to the previous threshold value or a different threshold value at step 1009. The UE may then receive or attempt to receive eMBMS content at step 1002. However, if the timer expires before the MCCH is received, then the UE determines that an eMBMS RLF has occurred at step 1010. Upon detecting an eMBMS RLF at step 1010, the UE may then recover from the eMBMS RLF at step 1012, 1014, 1016, or 1018.

For example, if the UE determines an eMBMS RLF based on decoding errors of the MSI MAC control element at step 1006, the UE receives eMBMS content which includes the MSI MAC control element and determines N consecutive MSI MAC control element decoding errors. If N is less than a threshold $N_4$ (e.g., $N_4$=10), then the UE determines that no eMBMS RLF has occurred and receives or attempts to receive eMBMS content at step 1002. However, if N is greater than the threshold $N_4$, then the UE determines that an eMBMS RLF has occurred at step 1010. The UE may then recover from the eMBMS RLF at step 1012, 1014, 1016, or 1018. In another configuration, if the UE implements a timer for determining an eMBMS RLF, the UE may set a timer to a threshold value at step 1001. The UE may then receive or attempt to receive eMBMS content at step 1002. If the MSI is received before the timer expires, the UE may determine that no eMBMS RLF has occurred at step 1008 and may reset the timer to the previous threshold value or a different threshold value at step 1009. The UE may then receive or attempt to receive eMBMS content at step 1002. However, if the timer expires before the MSI is received, then the UE determines that an eMBMS RLF has occurred at step 1010. Upon detecting an eMBMS RLF at step 1010, the UE may then recover from the eMBMS RLF at step 1012, 1014, 1016, or 1018.

For example, at step 1012, with reference to FIG. 9, the UE may attempt to recover from the eMBMS RLF detected at step 1010 by (A) reacquiring 980 at least one of the SIB13, a multicast/broadcast area configuration message on the MCCH, MSI, or data on a MTCH from the eNB 952a. At step 1014, the UE may recover from the eMBMS RLF detected at step 1010 by (B) performing a service announcement and discovery procedure to receive the configuration for multicast/broadcast services from the eNB 952a and then performing (A) with respect to eNB 952a. At step 1016, the UE may attempt to recover from the eMBMS RLF detected at step 1010 by (C) reselecting from the current eNB 952a on a first frequency to a different eNB 952b on the first frequency and then performing (A) with respect to the eNB 952b to acquire 985 at least one of the SIB13, a multicast/broadcast area configuration message on the MCCH, MSI, or data on a MTCH from the eNB 952b. At step 1018, the UE may attempt to recover from the eMBMS RLF detected at step 1010 by (D) reselecting from the current eNB 952a on the first frequency to a different eNB 954a within the MBSFN area 954 on a second frequency and then performing (A) with respect to the eNB 954a to acquire 990 at least one of the SIB13, a multicast/broadcast area configuration message on the MCCH, MSI, or data on an MTCH from the eNB 954a.

Figure 11:
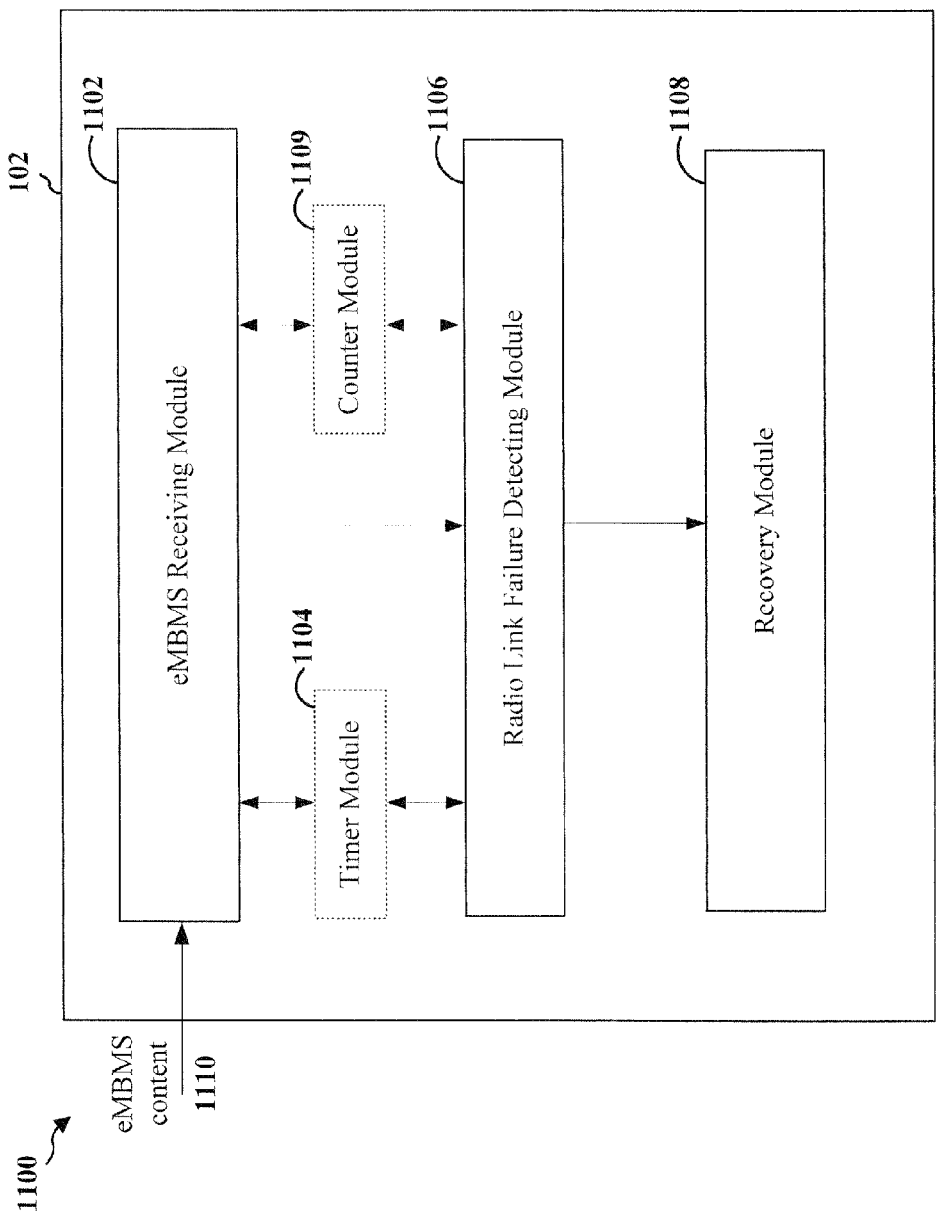
FIG. 11 is a conceptual data flow diagram illustrating the data flow between different modules/means/components in an exemplary apparatus.

FIG. 11 is a conceptual data flow diagram 1100 illustrating the data flow between different modules/means/components in an exemplary apparatus 102. The apparatus 102 includes an eMBMS receiving module 1102 that is configured to receive eMBMS content 1110. The eMBMS content 1110 includes at least one of an MTCH, an MCCH, or MSI. When the apparatus implements a timer-based approach to determine an eMBMS RLF, the apparatus may further include a timer module 1104 that is configured to set a timer based on a threshold period of time. When the apparatus implements a counter to determine an eMBMS RLF, the apparatus may further include a counter module 1109 that is configured to count the number of decoding errors. The counter module 1109 may be implemented using a register or data structure in a processor of the apparatus 102. The apparatus further includes an RLF detecting module 1106 configured to detect a multicast/broadcast RLF based on at least one of decoding errors, lost or error packets/segments, or failure to receive a multicast/broadcast channel for a time period greater than a threshold. The apparatus further includes a recovery module 1108 that is configured to recover from the detected multicast/broadcast RLF upon detecting the multicast/broadcast RLF.

The RLF detecting module 1106 may be configured to detect an eMBMS RLF if the UE encounters a number of consecutive MTCH decoding errors greater than a threshold, a number of MTCH decoding errors within a particular set of subframes greater than a threshold, a number of lost or error packets with respect to a total number of packets received greater than a threshold, or a number of lost or error file segments with respect to a total number of file segments received greater than a threshold. The RLF detecting module 1106 may be further configured to detect an eMBMS RLF if the UE encounters a number of consecutive MCCH decoding errors greater than a threshold, or the MCCH is not received for a time period greater than a threshold. The RLF detecting module 1106 may be further configured to detect an eMBMS RLF if the UE encounters a number of consecutive MSI MAC control element decoding errors greater than a threshold, or the MSI is not received for a time period greater than a threshold The RLF recovery module 1108 can be configured to (A) reacquire at least one of system information (e.g., SIB13), a multicast/broadcast area configuration message, MSI, or data on an MTCH. The RLF recovery module 1108 can be further configured to (B) perform a service announcement and discovery procedure to receive a configuration for multicast/broadcast services and then perform (A). The RLF recovery module 1108 can be further configured to (C) reselect from the current cell on a first frequency to a different cell on the first frequency and then perform (A) with respect to the different cell. The RLF recovery module 1108 can be further configured to (D) reselect from the current cell on a first frequency to a different cell on a second frequency and then perform (A) with respect to the different cell.

The apparatus may include additional modules that perform each of the steps of the algorithm in the aforementioned flow chart of FIG. 10. As such, each step in the aforementioned flow chart of FIG. 10 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 12:
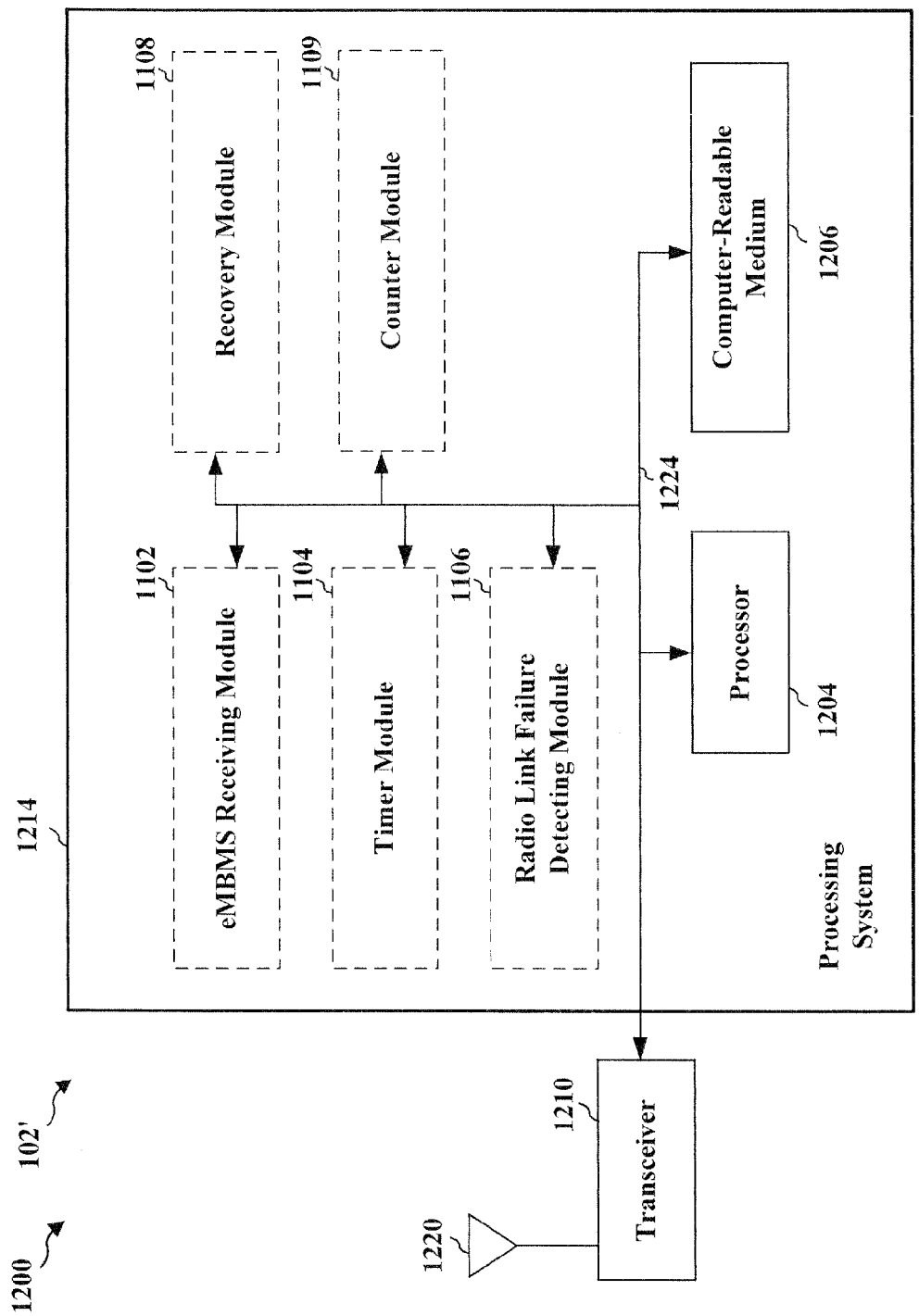
FIG. 12 is a diagram illustrating an example of a hardware implementation for an apparatus employing a processing system.

FIG. 12 is a diagram illustrating an example of a hardware implementation for an apparatus 102' employing a processing system 1214. The processing system 1214 may be implemented with a bus architecture, represented generally by the bus 1224. The bus 1224 may include any number of interconnecting buses and bridges depending on the specific application of the processing system 1214 and the overall design constraints. The bus 1224 links together various circuits including one or more processors and/or hardware modules, represented by the processor 1204, the modules 1102, 1104, 1106, 1108, 1109, and the computer-readable medium 1206. The bus 1224 may also link various other circuits such as timing sources, peripherals, voltage regulators, and power management circuits, which are well known in the art, and therefore, will not be described any further.

The processing system 1214 may be coupled to a transceiver 1210. The transceiver 1210 is coupled to one or more antennas 1220. The transceiver 1210 provides a means for communicating with various other apparatus over a transmission medium. The processing system 1214 includes a processor 1204 coupled to a computer-readable medium 1206. The processor 1204 is responsible for general processing, including the execution of software stored on the computer-readable medium 1206. The software, when executed by the processor 1204, causes the processing system 1214 to perform the various functions described supra for any particular apparatus. The computer-readable medium 1206 may also be used for storing data that is manipulated by the processor 1204 when executing software. The processing system further includes at least one of the modules 1102, 1104, 1106, 1108, and 1109. The modules may be software modules running in the processor 1204, resident/stored in the computer readable medium 1206, one or more hardware modules coupled to the processor 1204, or some combination thereof. The processing system 1214 may be a component of the UE 650 and may include the memory 660 and/or at least one of the TX processor 668, the RX processor 656, and the controller/processor 659.

In one configuration, the apparatus 102/102' for wireless communication includes means for detecting a multicast/broadcast RLF based on at least one of decoding errors, lost or error packets/segments, or failure to receive a multicast/ broadcast channel for a time period greater than a threshold. The apparatus further includes means for recovering from the detected multicast/broadcast RLF upon detecting the multicast/broadcast RLF.

The aforementioned means may be one or more of the aforementioned modules of the apparatus 102 and/or the processing system 1214 of the apparatus 102' configured to perform the functions recited by the aforementioned means. As described supra, the processing system 1214 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication for a user equipment (UE), comprising:
   detecting, by the UE, a multicast/broadcast radio link failure based on at least one of decoding errors, lost or error packets/segments, or failure to receive a multicast/broadcast channel for a time period greater than a threshold; and
   recovering, by the UE, from the detected multicast/broadcast radio link failure upon detecting the multicast/broadcast radio link failure,
   wherein the decoding errors are multicast/broadcast decoding errors and the lost or error packets/segments are lost or error multicast/broadcast packets/segments.

2. The method of claim 1, wherein the multicast/broadcast radio link failure is detected when consecutive multicast traffic channel (MTCH) decoding errors are greater than a threshold.

3. The method of claim 1, wherein the multicast/broadcast radio link failure is detected when multicast traffic channel (MTCH) decoding errors within a particular set of subframes are greater than a threshold.

4. The method of claim 1, wherein the multicast/broadcast radio link failure is detected when consecutive multicast control channel (MCCH) decoding errors are greater than a threshold.

5. The method of claim 1, wherein the multicast/broadcast radio link failure is detected when consecutive multicast channel scheduling information (MSI) media access control (MAC) control element decoding errors are greater than a threshold.

6. The method of claim 1, wherein the multicast/broadcast radio link failure is detected when lost or error packets with respect to a total number of packets received are greater than a threshold.

7. The method of claim 1, wherein the multicast/broadcast radio link failure is detected when lost or error file segments with respect to a total number of file segments received are greater than a threshold.

8. The method of claim 1, wherein the recovering from the detected multicast/broadcast radio link failure comprises at least one of:
   (i) reacquiring at least one of system information, a multicast/broadcast area configuration message, multicast channel scheduling information (MSI), or data on a multicast traffic channel (MTCH);
   (ii) performing a service announcement and discovery procedure to receive a configuration for multicast/broadcast services and performing (i);
   (iii) reselecting from a current cell on a first frequency to a different cell on the first frequency and performing (i); or
   (iv) reselecting from a current cell on the first frequency to a different cell on a second frequency and performing (i).

9. The method of claim 1, wherein the multicast/broadcast radio failure is an evolved Multimedia Broadcast Multicast Service (eMBMS) radio link failure.

10. The method of claim 1, wherein the multicast/broadcast radio link failure is detected when at least one of a multicast control channel (MCCH) or multicast channel scheduling information (MSI) is not received for a time period greater than a threshold.

11. An apparatus for wireless communication, comprising:
    means for detecting a multicast/broadcast radio link failure based on at least one of decoding errors, lost or error packets/segments, or failure to receive a multicast/broadcast channel for a time period greater than a threshold; and
    means for recovering from the detected multicast/broadcast radio link failure upon detecting the multicast/broadcast radio link failure,
    wherein the decoding errors are multicast/broadcast decoding errors and the lost or error packets/segments are lost or error multicast/broadcast packets/segments.

12. The apparatus of claim 11, wherein the multicast/broadcast radio link failure is detected when consecutive multicast traffic channel (MTCH) decoding errors are greater than a threshold.

13. The apparatus of claim 11, wherein the multicast/broadcast radio link failure is detected when multicast traffic channel (MTCH) decoding errors within a particular set of subframes are greater than a threshold.

14. The apparatus of claim 11, wherein the multicast/broadcast radio link failure is detected when consecutive multicast control channel (MCCH) decoding errors are greater than a threshold.

15. The apparatus of claim 11, wherein the multicast/broadcast radio link failure is detected when consecutive multicast channel scheduling information (MSI) media access control (MAC) control element decoding errors are greater than a threshold.

16. The apparatus of claim 11, wherein the means for recovering from the detected multicast/broadcast radio link failure is configured to perform at least one of:
(i) reacquire at least one of system information, a multicast/broadcast area configuration message, multicast channel scheduling information (MSI), or data on a multicast traffic channel (MTCH);
(ii) perform a service announcement and discovery procedure to receive a configuration for multicast/broadcast services and perform (i);
(iii) reselect from a current cell on a first frequency to a different cell on the first frequency and perform (i); or
(iv) reselect from a current cell on the first frequency to a different cell on a second frequency and perform (i).

17. The apparatus of claim 11, wherein the multicast/broadcast radio link failure is detected when at least one of a multicast control channel (MCCH) or multicast channel scheduling information (MSI) is not received for a time period greater than a threshold.

18. An apparatus for wireless communication, comprising:
a processing system configured to:
detect a multicast/broadcast radio link failure based on at least one of decoding errors, lost or error packets/segments, or failure to receive a multicast/broadcast channel for a time period greater than a threshold; and
recover from the detected multicast/broadcast radio link failure upon detecting the multicast/broadcast radio link failure,
wherein the decoding errors are multicast/broadcast decoding errors and the lost or error packets/segments are lost or error multicast/broadcast packets/segments.

19. The apparatus of claim 18, wherein the multicast/broadcast radio link failure is detected when consecutive multicast traffic channel (MTCH) decoding errors are greater than a threshold.

20. The apparatus of claim 18, wherein the multicast/broadcast radio link failure is detected when multicast traffic channel (MTCH) decoding errors within a particular set of subframes are greater than a threshold.

21. The apparatus of claim 18, wherein the multicast/broadcast radio link failure is detected when consecutive multicast control channel (MCCH) decoding errors are greater than a threshold.

22. The apparatus of claim 18, wherein the multicast/broadcast radio link failure is detected when consecutive multicast channel scheduling information (MSI) media access control (MAC) control element decoding errors are greater than a threshold.

23. The apparatus of claim 18, wherein the multicast/broadcast radio link failure is detected when lost or error packets with respect to a total number of packets received are greater than a threshold.

24. The apparatus of claim 18, wherein the multicast/broadcast radio link failure is detected when lost or error file segments with respect to a total number of file segments received are greater than a threshold.

25. The apparatus of claim 18, wherein the processing system recovers from the detected multicast/broadcast radio link failure upon detecting the multicast/broadcast radio link failure by performing at least one of:
(i) reacquiring at least one of system information, a multicast/broadcast area configuration message, multicast channel scheduling information (MSI), or data on a multicast traffic channel (MTCH);
(ii) performing a service announcement and discovery procedure to receive a configuration for multicast/broadcast services and performing (i);
(iii) reselecting from a current cell on a first frequency to a different cell on the first frequency and performing (i); or
(iv) reselecting from a current cell on the first frequency to a different cell on a second frequency and performing (i).

26. The apparatus of claim 18, wherein the multicast/broadcast radio failure is an evolved Multimedia Broadcast Multicast Service (eMBMS) radio link failure.

27. The apparatus of claim 18, wherein the multicast/broadcast radio link failure is detected when at least one of a multicast control channel (MCCH) or multicast channel scheduling information (MSI) is not received for a time period greater than a threshold.

28. A computer program product, comprising:
a non-transitory computer-readable medium comprising code for:
detecting a multicast/broadcast radio link failure based on at least one of decoding errors, lost or error packets/segments, or failure to receive a multicast/broadcast channel for a time period greater than a threshold; and
recovering from the detected multicast/broadcast radio link failure upon detecting the multicast/broadcast radio link failure,
wherein the decoding errors are multicast/broadcast decoding errors and the lost or error packets/segments are lost or error multicast/broadcast packets/segments.

* * * * *